(12) United States Patent
Suzuki et al.

(10) Patent No.: US 8,079,642 B2
(45) Date of Patent: Dec. 20, 2011

(54) FRAME PART, SEAT FRAME FOR MOTORCYCLE, AND MOTORCYCLE

(75) Inventors: Takaharu Suzuki, Shizuoka (JP); Junichi Inami, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 487 days.

(21) Appl. No.: 12/174,072

(22) Filed: Jul. 16, 2008

(65) Prior Publication Data
US 2009/0021059 A1    Jan. 22, 2009

(30) Foreign Application Priority Data
Jul. 17, 2007 (JP) ................................. 2007-185348

(51) Int. Cl.
*A47C 7/02* (2006.01)
*B62J 1/08* (2006.01)
*B62K 11/00* (2006.01)

(52) U.S. Cl. ................. 297/452.18; 297/195.1; 180/219

(58) Field of Classification Search ............. 297/452.18, 297/195.1; 180/219
See application file for complete search history.

(56) References Cited

U.S. PATENT DOCUMENTS

| | | | |
|---|---|---|---|
| 5,375,677 A | 12/1994 | Yamagiwa et al. | |
| 6,047,786 A * | 4/2000 | Stevenson et al. | 180/65.1 |
| 6,290,017 B1 * | 9/2001 | Ito | 180/227 |
| 7,681,680 B2 * | 3/2010 | Ishikawa et al. | 180/219 |

FOREIGN PATENT DOCUMENTS

| | | |
|---|---|---|
| EP | 881116 A2 * | 12/1998 |
| EP | 1 550 605 A1 | 7/2005 |
| JP | 11-010280 A | 1/1999 |
| JP | 2006-240345 A | 9/2006 |
| JP | 2006-264673 A | 10/2006 |

OTHER PUBLICATIONS

Official Communication issued in corresponding European Patent Application No. 08012863.0, mailed on Sep. 29, 2009.

* cited by examiner

*Primary Examiner* — Milton Nelson, Jr.
(74) *Attorney, Agent, or Firm* — Keating & Bennett, LLP

(57) ABSTRACT

A magnesium alloy frame part for use in a seat frame of a motorcycle includes a seat mounting section arranged to mount a seat thereon, the seat mounting section extending along a vehicle length direction; a first side wall section extending from the seat mounting section; a second side wall section extending from the seat mounting section and being located on the outer side, along a vehicle width direction, of the first side wall section; and a plurality of protrusions provided at at least one of a boundary between the seat mounting section and the first side wall section and a boundary between the seat mounting section and the second side wall section. The seat mounting section has a thickness greater than at least one of a thickness of the first side wall section and a thickness of the second side wall section.

9 Claims, 10 Drawing Sheets

FRAME PART, SEAT FRAME FOR MOTORCYCLE, AND MOTORCYCLE

BACKGROUND OF THE INVENTION

1. Field of the Invention

The present invention relates to a frame part for use in a seat frame for a motorcycle, and more particularly relates to a frame part composed of a magnesium alloy. The present invention also relates to a seat frame for a motorcycle or a motorcycle which incorporates such frame parts.

2. Description of the Related Art

As the material for parts of a motorcycle, steel has often been used because it provides good mechanical properties and processability, and also is inexpensive. However, in order to attain improved fuel consumption and running performance, it has become important to reduce the weight of a motorcycle. Therefore, use of a material that is lighter than steel has been studied.

In recent years, inexpensive refining methods for titanium, aluminum, magnesium, and the like, each of which has a smaller specific gravity than that of steel, and methods for producing alloys containing such metals have been developed. There have also been developed techniques for improving the strength and processability of such alloys.

This has led to proposals for using alloys of titanium, aluminum, or magnesium as the material for motorcycle parts. In particular, since magnesium has a density which is about 23% of that of steel, the weight of a motorcycle can be substantially reduced by forming its large-sized structural parts from a magnesium alloy.

For example, it is preferable to compose a seat frame that is provided below a rider's seat and a passenger's seat (e.g., as disclosed in Japanese Laid-Open Patent Publication No. 2006-240345) from a magnesium alloy. As the seat frame becomes light-weight, fuel consumption and running performance can be further improved.

Such a structural part attains a high strength when it is integrally formed by a casting technique such as a die-casting technique. Even if the structural part has a complex shape, the structural part can be formed into a desired shape through a single casting, thus reducing the number of production steps. Thus, reduction in the amount of time required for manufacture as well as production cost can be achieved.

However, it has been found that forming a seat frame from a magnesium alloy by a die-casting technique or the like results in the following problems.

A seat frame is subjected to a large load because a seat for a rider to sit on is attached thereto. Thus, it is necessary to reduce the stress occurring at the portions where a large load is applied. A traditional solution would be to increase the thickness of such portions. However, in that case, due to the difference in thickness between the portions with increased thicknesses and portions without the increased thicknesses, shrinkage cracks and shrinkage cavities are likely to occur at boundaries between such portions of different thicknesses. Shrinkage cracks and shrinkage cavities are cracks and cavities which may occur due to a shrinkage resulting from solidification of the melt, i.e., the melted metal. Since magnesium alloys have a smaller specific heat (specific heat at constant volume) than those of steel and aluminum alloys, portions without the increased thicknesses solidify quickly. Therefore, a seat frame composed of a magnesium alloy is liable to have shrinkage cracks and shrinkage cavities. If casting defects such as shrinkage cracks and shrinkage cavities occur in places which are subject to a large stress, the strength of the seat frame will decrease. On the other hand, increasing the thickness for all portions would induce a lowered cooling rate during casting, thus resulting in a lower strength.

SUMMARY OF THE INVENTION

In order to overcome the problems described above, preferred embodiments of the present invention minimize and prevent the occurrence of shrinkage cracks and shrinkage cavities when molding a magnesium alloy frame part, and provide a magnesium alloy frame part having a high strength as well as a seat frame for a motorcycle or a motorcycle which incorporates such frame parts.

A frame part according to a preferred embodiment of the present invention for use in a seat frame for a motorcycle is composed of a magnesium alloy and includes a seat mounting section arranged to have a seat mounted thereon, the seat mounting section extending along a vehicle length direction; a first side wall section extending from the seat mounting section; a second side wall section extending from the seat mounting section and being located on an outer side, along a vehicle width direction, of the first side wall section; and a plurality of protrusions provided at least one of a boundary between the seat mounting section and the first side wall section and a boundary between the seat mounting section and the second side wall section, wherein the seat mounting section has a thickness greater than at least one of a thickness of the first side wall section and a thickness of the second side wall section.

In a preferred embodiment, the plurality of protrusions are provided at both of the boundary between the seat mounting section and the first side wall section and the boundary between the seat mounting section and the second side wall section.

In a preferred embodiment, a width of each of the plurality of protrusions along the vehicle length direction is preferably no less than about 0.3 mm and no more than about 1.5 mm, and the plurality of protrusions are spaced apart at a distance of preferably no less than about 2.0 mm and no more than about 10.0 mm, for example.

In a preferred embodiment, an area of any cross-section of each of the plurality of protrusions that is perpendicular or substantially perpendicular to the vehicle length direction and parallel to the vehicle width direction is preferably no less than about 0.5 mm$^2$ and no more than about 6.0 mm$^2$, for example.

A seat frame for a motorcycle according to another preferred embodiment of the present invention includes a pair of frame parts, and a linking member arranged to link the pair of frame parts to each other, wherein the pair of frame parts and the linking member are integrally formed, and each of the pair of frame parts is a frame part having the aforementioned construction.

In a preferred embodiment, the seat frame for the motorcycle is molded by a die-casting technique or a Thixomolding technique, and each of the pair of frame parts includes a gate portion through which the melt is to be injected.

In a preferred embodiment, the gate portion is provided at a side surface of the seat mounting section of each of the pair of frame parts, the side surface being on an outer side along the vehicle width direction.

In a preferred embodiment, each of the pair of frame parts has the plurality of protrusions at least in a boundary between the seat mounting section and the second side wall section.

In a preferred embodiment, the gate portion has a thickness smaller than a thickness of the seat mounting section.

In a preferred embodiment, each of the pair of frame parts includes a plurality of engaging portions for coupling the seat frame to another part, and along the vehicle length direction, the gate portion is located between the plurality of engaging portions.

A motorcycle according to a preferred embodiment of the present invention includes a seat frame for a motorcycle, the seat frame having the aforementioned construction, and a seat supported by the seat frame.

In the frame part according to a preferred embodiment of the present invention, a plurality of protrusions are provided at least one of the boundary between the seat mounting section and the first side wall section (inner side wall section) and the boundary between the seat mounting section and the second side wall section (outer side wall section), wherein the surface area of each such boundary is increased. This provides for an increased cooling rate at the boundaries during molding, thus suppressing the occurrence of shrinkage cracks and shrinkage cavities. Thus, deterioration in the strength of the frame part can be prevented. Moreover, the plurality of protrusions allow dispersion of the shrinkage of the frame part along the vehicle length direction (i.e., shrinkage associated with solidification), thus also improving the dimensional accuracy.

When a plurality of protrusions are provided at both of the boundary between the seat mounting section and the first side wall section and the boundary between the seat mounting section and the second side wall section, the occurrence of shrinkage cracks and shrinkage cavities at both boundaries can be prevented and minimized, thus enhancing the prevention of the deterioration in the strength.

In order to sufficiently increase the surface area at the boundaries and allow the shrinkage along the vehicle length direction of the frame part to sufficiently disperse, it is preferable that the width of each of the plurality of protrusions along the vehicle length direction is preferably no less than about 0.3 mm and no more than about 1.5 mm and that the plurality of protrusions are spaced apart at a distance of preferably no less than about 2.0 mm and no more than about 10.0 mm, for example.

From a similar standpoint, it is furthermore preferable that any cross-section of each of the plurality of protrusions that is orthogonal to the vehicle length direction and parallel to the vehicle width direction preferably has an area of no less than about 0.5 mm$^2$ and no more than about 6.0 mm$^2$, for example.

The frame part according to a preferred embodiment of the present invention has a light weight and a high strength, and therefore is suitably used for a seat frame for a motorcycle. A seat frame for a motorcycle typically includes a pair of frame parts, and a linking member arranged to link the pair of frame parts to each other. In the case where the pair of frame parts and the linking member are integrally formed, it is preferable that both of the pair of frame parts have the aforementioned protrusions. In other words, it is preferable that each of the pair of frame parts include the features of the frame part according to the various preferred embodiments of the present invention. When both of the pair of frame parts have protrusions, it is possible to reduce variations in the strength and rigidity between one frame part and another frame part.

The seat frame for a motorcycle according to a preferred embodiment of the present invention can be suitably molded by a die-casting technique or a Thixomolding (semi-melted molding) technique, for example. By providing a gate portion (through which the melt is to be injected) on each of the pair of frame parts and allowing the melt to flow along the front-rear direction (vehicle length direction), the differences in the melt flow and/or cooling rate between the right and left frame parts can be reduced, and the variations in the strength between one frame part and another frame part can be minimized. Moreover, the time from start to end of the melt filling the mold can be shortened, which also suppresses the occurrence of shrinkage cracks and shrinkage cavities.

It is preferable that the gate portion is provided at a side surface that is on the outer side (along the vehicle width direction) of the seat mounting section of each of the pair of frame parts. By providing the gate portion on the outer side surface of the seat mounting section, the finishing process is facilitated and the filling distance is reduced, wherein both moldability and finishability can be enhanced.

In the case where the gate portion is provided on the outer side surface of the seat mounting section, it is preferable that the plurality of protrusions are provided at least the boundary (outer boundary) between the seat mounting section and the second side wall section of each of the pair of frame parts. When the protrusions are provided at the outer boundary, which is in the vicinity of the gate portion, it becomes possible to increase the cooling rate in the vicinity of the gate portion, where the mold temperature is liable to increase and stay high. As a result, the occurrence of shrinkage cracks and shrinkage cavities at the outer boundary in the vicinity of the gate portion can be prevented and minimized.

After casting, the seat frame having been taken out of the mold is separated from a runner at the gate portion. If the thickness of the gate portion is smaller than the thickness of the seat mounting section, the runner can be easily broken off.

Each of the pair of frame parts typically includes a plurality of engaging portions for coupling the seat frame to other parts (e.g., a main frame and a seat). The mold temperature is likely to fluctuate near the gate portion, thus resulting in varying cooling rates. Therefore, in the case where the gate portion is located between a plurality of engaging portions along the vehicle length direction, a dimensional mismatch between engaging portions would be likely to occur if the protrusions were not provided. Therefore, in the case where the gate portion exists between a plurality of engaging portions, there is a high likelihood of preventing dimensional mismatching by providing protrusions according to a preferred embodiment of the present invention.

A seat frame for a motorcycle according to a preferred embodiment of the present invention has a light weight and a high strength. Therefore, a motorcycle incorporating the seat frame according to a preferred embodiment of the present invention has excellent running performance and fuel consumption.

According to a preferred embodiment of the present invention, the occurrence of shrinkage cracks and shrinkage cavities when molding a magnesium alloy frame part can be prevented and minimized, and a magnesium alloy frame part having a high strength is provided. Moreover, according to a preferred embodiment of the present invention, a seat frame for a motorcycle or a motorcycle which incorporates such a frame part is provided.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. Note that the present invention is not to be limited to the following preferred embodiments.

Figure 1:
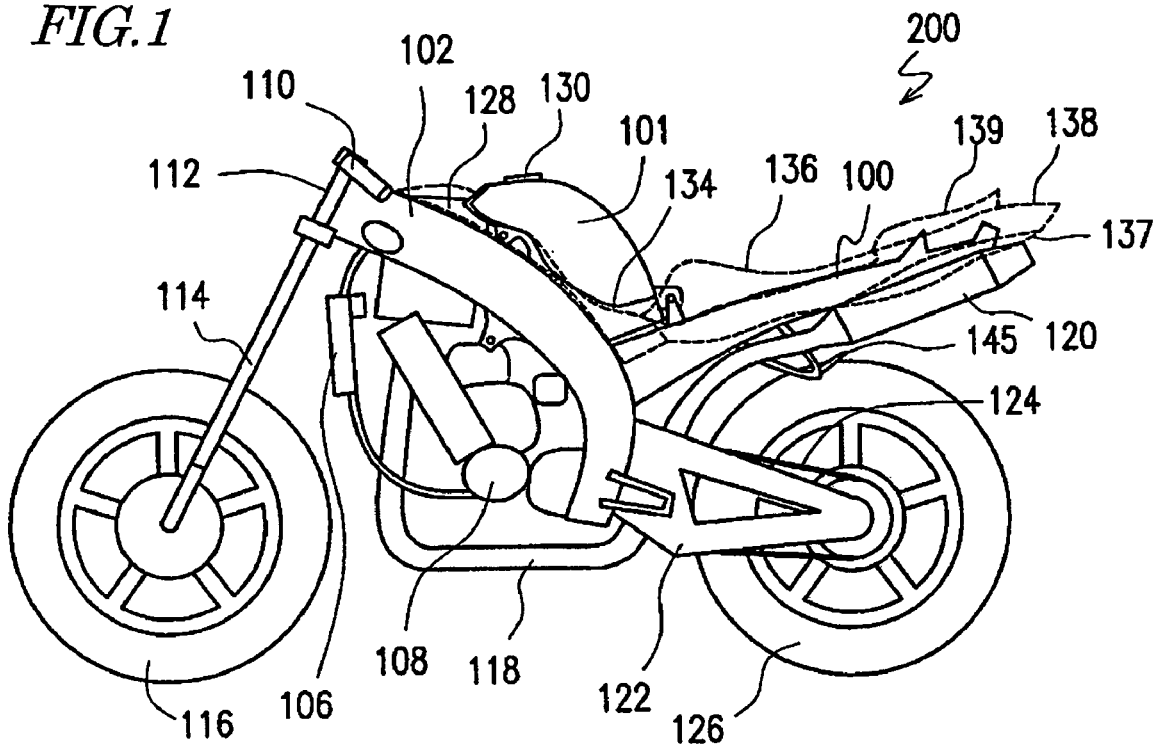
FIG. 1 is a side view schematically showing a motorcycle having a seat frame according to a preferred embodiment of the present invention.

FIG. 1 shows a motorcycle 200 having a seat frame for a motorcycle (hereinafter simply referred to as a "seat frame") 100 according to the present preferred embodiment. The motorcycle 200 includes a fuel tank 101, a main frame 102, the seat frame 100, an internal combustion engine 108, a front wheel 116, and a rear wheel 126. The motorcycle 200 is a saddle-riding type vehicle to be ridden by a rider mounted on the motorcycle 200.

Figure 2:
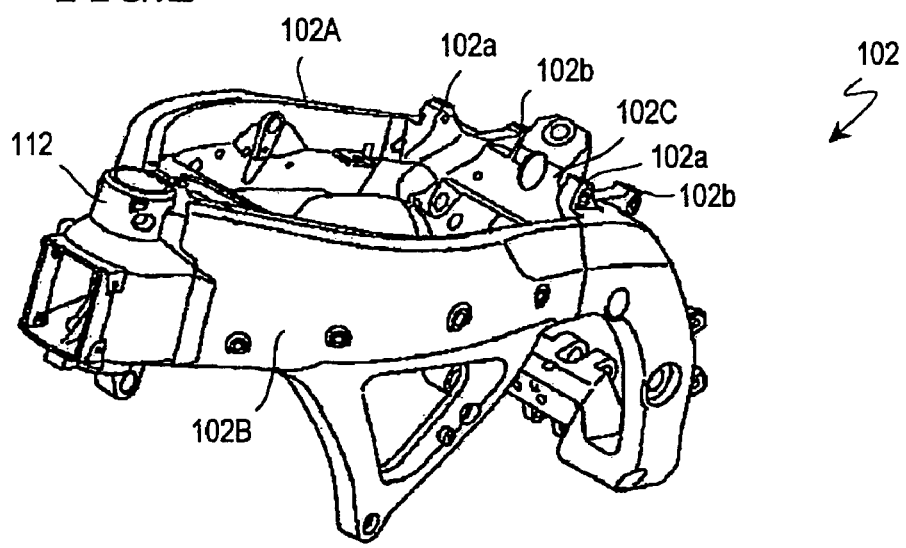
FIG. 2 is a perspective view schematically showing a main frame of the motorcycle shown in FIG. 1.

FIG. 2 is an enlarged perspective view showing the main frame 102. The main frame 102 includes a pair of frames 102A and 102B which are connected to a head pipe 112, which is located at the front of the vehicle. At a central portion of the motorcycle 200, each of the frames 102A and 102B defines a curved portion so as to extend in the lower direction. The frames 102A and 102B are linked to each other at the ends. At the curved portion, a link portion 102C for interlinking the frames 102A and 102B is provided. A pair of first engaging portions 102a and a pair of second engaging portions 102b are provided on the link portion 102C for allowing the seat frame 100 to be fixed thereto. Each of the first engaging portions 102a and the second engaging portions 102b in the present preferred embodiment is a stay having a hole in which a bolt is inserted. The main frame 102 and the seat frame 100 define the body of the motorcycle 200.

As shown in FIG. 1, to the head pipe 112, a front fork 114 is attached so as to be capable of rotating. At one end of the front fork 114, the front wheel 116 is supported so as to be capable of rotating freely. Handles 110 are affixed to the other end of the front fork 114.

The fuel tank 101 is mounted astride the main frame 102 and the seat frame 100, near the central portion of the motorcycle 200. At the front of the fuel tank 101, an air cleaner 128 is provided. A cap 130 which covers a fuel injection inlet (not shown) is provided on the fuel tank 101.

The internal combustion engine 108 is supported by the main frame 102 so as to be located below the fuel tank 101. A radiator 106 is provided in front of the internal combustion engine 108. An exhaust pipe 118 is connected to an exhaust outlet of the internal combustion engine 108. Although not shown in detail in FIG. 1, one end of the exhaust pipe 118 is split into plural portions for guiding exhaust gas from a plurality of cylinders of the internal combustion engine 108. The exhaust pipe 118 extends below the internal combustion engine and along the seat frame 100 toward the rear. The exhaust pipe 118 is split into two portions near the seat frame 100, each split pipe being connected to a muffler 120. The exhaust pipe 118 and the mufflers 120 are supported by the seat frame 100. A pair of footrests 145 are provided on the seat frame 100.

A rear arm 122 is connected to the main frame 102. The rear arm 122 supports the rear wheel 126 so as to be capable of rotating freely. The rotary driving force from the internal combustion engine 108 is transmitted to the rear wheel 126 via a chain 124.

In addition, the motorcycle 200 includes a decorative cover 134 which covers a lower portion of the fuel tank 101, a rider's seat 136, a rear cover 137, a side cover 138, and a passenger's seat 139. In order to clearly illustrate the seat frame 100, these parts are shown by broken lines in FIG. 1.

As described above, the main frame 102 and the seat frame 100 define the body of the motorcycle 200, and therefore need to have a high strength for being able to support various structural parts of the motorcycle 200. In particular, the seat frame 100 supports the rider's seat 136, the passenger's seat 139, and the footrests 145, and thus the weight of the rider and the passenger will act on the seat frame 100.

Figure 3:
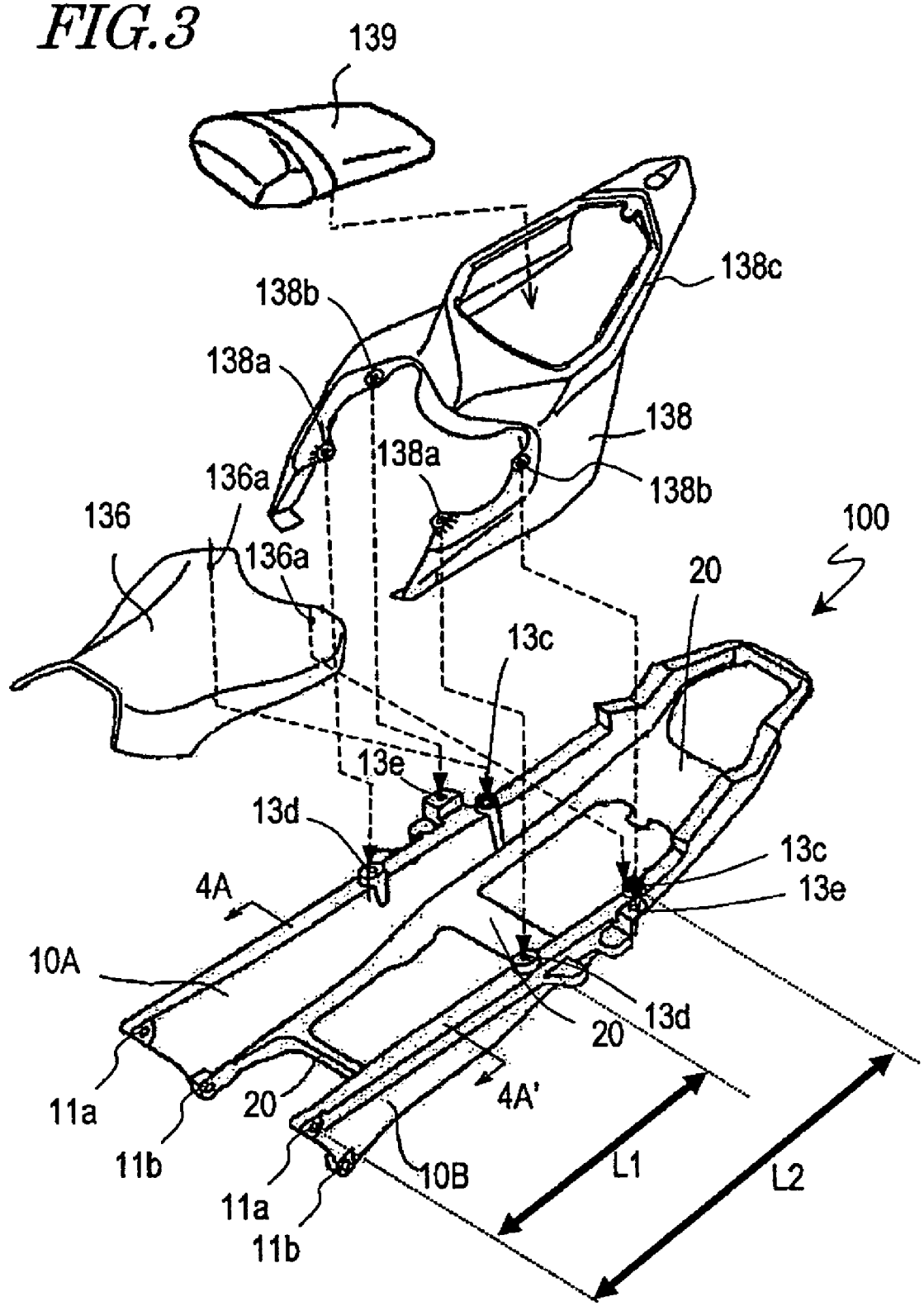
FIG. 3 is an exploded perspective view schematically showing a seat frame of the motorcycle shown in FIG. 1 as well as the structure above the seat frame.
Figure 4:
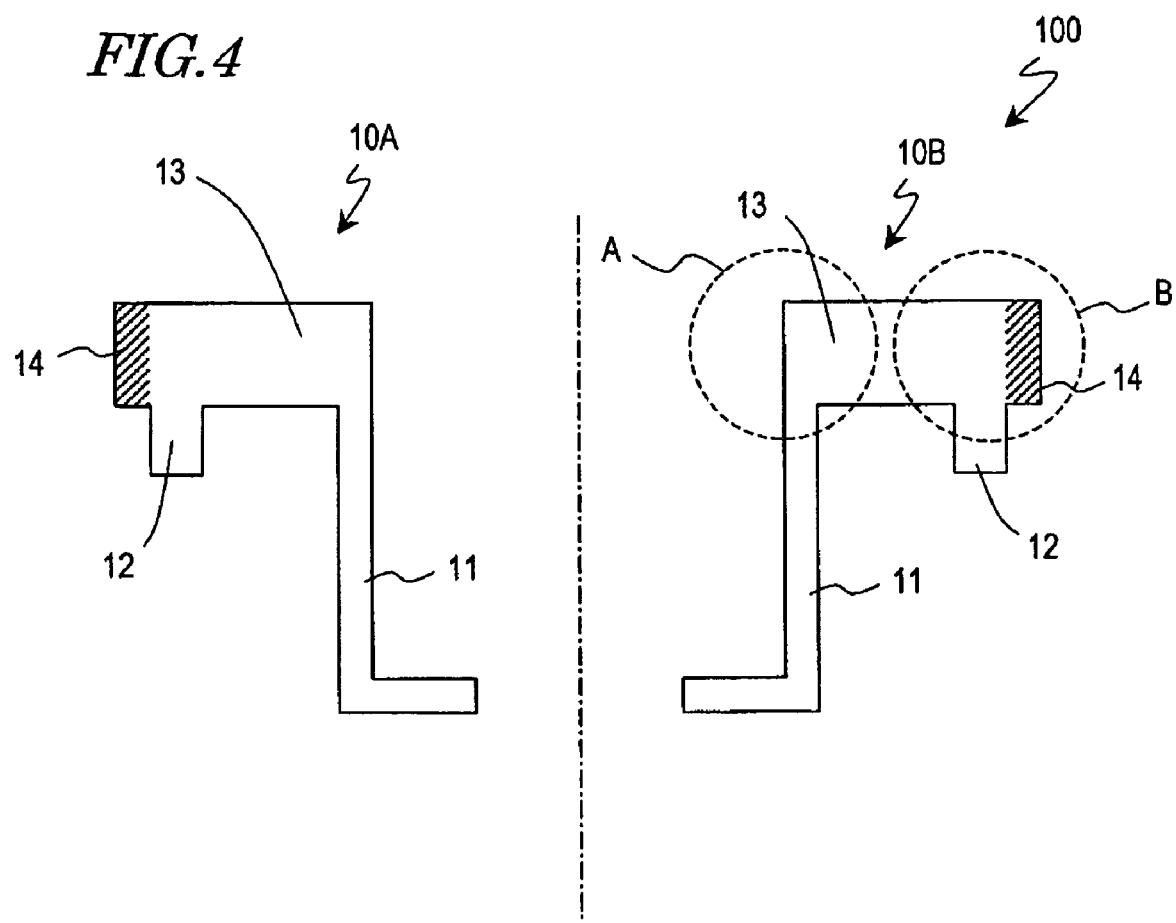
FIG. 4 is a cross-sectional view schematically showing a seat frame according to a preferred embodiment of the present invention, taken along line 4A-4A' in FIG. 3.

Hereinafter, with reference to FIG. 3 and FIG. 4, the structure of the seat frame (also referred to as a sub-frame or a rear frame) 100 according to the present preferred embodiment will be described in detail. FIG. 3 is an exploded perspective view illustrating the seat frame 100 of the motorcycle 200 as well as the structure above the set frame 100, in which the seat frame 100, the rider's seat 136, the side cover 138, and the passenger's seat 139 are shown. FIG. 4 is a cross-sectional view taken along line 4A-4A' in FIG. 3.

The seat frame 100 preferably includes a pair of frame parts (hereinafter referred to as "seat rails") 10A and 10B which are made of a magnesium alloy, and a linking member (hereinafter referred to as a "cross member") 20 for interlinking the pair of seat rails 10A and 10B. The seat rails 10A and 10B extend along a vehicle length direction (front-rear direction). On the other hand, the cross member 20 extends along a vehicle width direction (right-left direction). The cross member 20 interlinks the seat rails 10A and 10B so as to prevent the seat rails 10A and 10B from being twisted or bent, thus improving the strength and rigidity of the seat frame 100.

In the present preferred embodiment, the seat rails 10A and 10B and the cross member 20 are integrally formed. For example, molding the seat frame 100 by a die-casting technique will allow the seat rails 10A and 10B and the cross member 20 to be integrally formed. Alternatively, the cross member 20 may be formed as a separate piece from the seat rails 10A and 10B, and the cross member 20 may be mechanically coupled to the seat rails 10A and 10B.

When the cross member 20 is formed as a separate piece, the cross member 20 does not need to be made of a magnesium alloy. However, from the standpoint of providing the seat frame 100 with a light weight, it is preferable that the cross member 20 is also made of a magnesium alloy.

As shown in FIG. 4, each of the pair of seat rails 10A and 10B, which extends along the vehicle length direction, includes a seat mounting section (upper wall section) 13 on which the seats (i.e., the rider's seat 136 and the passenger's seat 139) are to be mounted; and a first side wall section 11 and a second side wall section 12 each extending in the lower direction from the seat mounting section 13. The second side wall section 12 is located on the outer side (along the vehicle width direction) of the first side wall section 11. Hereinafter, the first side wall section 11, which is located relatively inside, will be referred to as an "inner side wall section", whereas the second side wall section 12, which is located relatively outside, will be referred to as an "outer side wall section". The seat mounting section 13 is continuous from an upper end of the inner side wall section 11 to an upper end of the outer side wall section 12. Stated otherwise, the inner side wall section 11 and the outer side wall section 12 emerge from both ends (along the vehicle width direction) of the seat mounting section 13. Via the cross member 20, a lower end of the inner side wall section 11 of one seat rail 10A is linked to a lower end of the inner side wall section 11 of the other seat rail 10B. Note that the inner side wall section 11 and the outer side wall section 12 do not need to extend in the lower direction from the seat mounting section 13, but may extend in the upper direction, or extend in both of the upper and lower directions. In other words, the inner side wall section 11 and the outer side wall section 12 may extend in at least one of the upper direction and the lower direction from the seat mounting section 13.

As shown in FIG. 3, at an end of each inner side wall section 11 closer to the internal combustion engine 108, a first engaging portion 11a and a second engaging portion 11b for affixing the seat frame 100 to the main frame 102 are provided. As the first engaging portion 11a and the second engaging portion 11b are engaged with the first engaging portion 102a and the second engaging portion 102b of the main frame 102, the seat frame 100 and the main frame 102 are coupled to each other.

Third engaging portions 13c for allowing the rider's seat 136 to be attached to the seat frame 100 are provided on the seat mounting section 13. The rider's seat 136 is formed in a saddle shape, and includes a pair of engaging portions 136a. As shown by dotted lines in FIG. 3, as the engaging portions 136a of the rider's seat 136 are engaged with the third engaging portions 13c of the seat rails 10A and 10B, the seat frame 100 and the rider's seat 136 are coupled to each other.

On the seat mounting section 13, fourth engaging portions 13d and fifth engaging portions 13e for allowing the side cover 138 to be attached to the seat frame 100 are further provided. The side cover 138 includes a pair of first engaging portions 138a, a pair of second engaging portions 138b, and a support frame 138c for affixing the passenger's seat 139. As shown by dotted lines in FIG. 3, as the first engaging portions 138a of the side cover 138 are engaged with the fourth engaging portions 13d of the seat rails 10A and 10B and the second engaging portions 138b of the side cover 138 are engaged with the fifth engaging portions 13e of the seat rails 10A and 10B, the seat frame 100 and the side cover 138 are coupled to each other. The passenger's seat 139 is affixed to the seat frame 100 by the support frame 138c of the side cover 138.

Since the rider's seat 136 and the passenger's seat 139 are attached to the seat mounting section 13 and the seat mounting section 13 is subjected to a large load, the seat mounting section 13 should preferably have a high thickness. On the other hand, for achieving a light weight, the inner side wall section 11 and the outer side wall section 12 should be as thin as possible. In other words, the thickness of the seat mounting section 13 is preferably larger than at least one of the thickness of the inner side wall section 11 and the thickness of the outer side wall section 12, and more preferably larger than both of these as shown in FIG. 4.

Although not shown in FIG. 4, each of the seat rails 10A and 10B of the present preferred embodiment further includes a plurality of protrusions (ribs) provided at a boundary (intersection) between the inner side wall section 11 and the seat mounting section 13 and at a boundary (intersection) between the outer side wall section 12 and the seat mounting section 13. Hereinafter, these protrusions will be described more specifically. In the following description, the boundary between the inner side wall section 11 and the seat mounting section 13 will be referred to as an "inner boundary", whereas the boundary between the outer side wall section 12 and the seat mounting section 13 will be referred to as an "outer boundary". Both of them may be collectively referred to as "boundaries".

Figure 5:
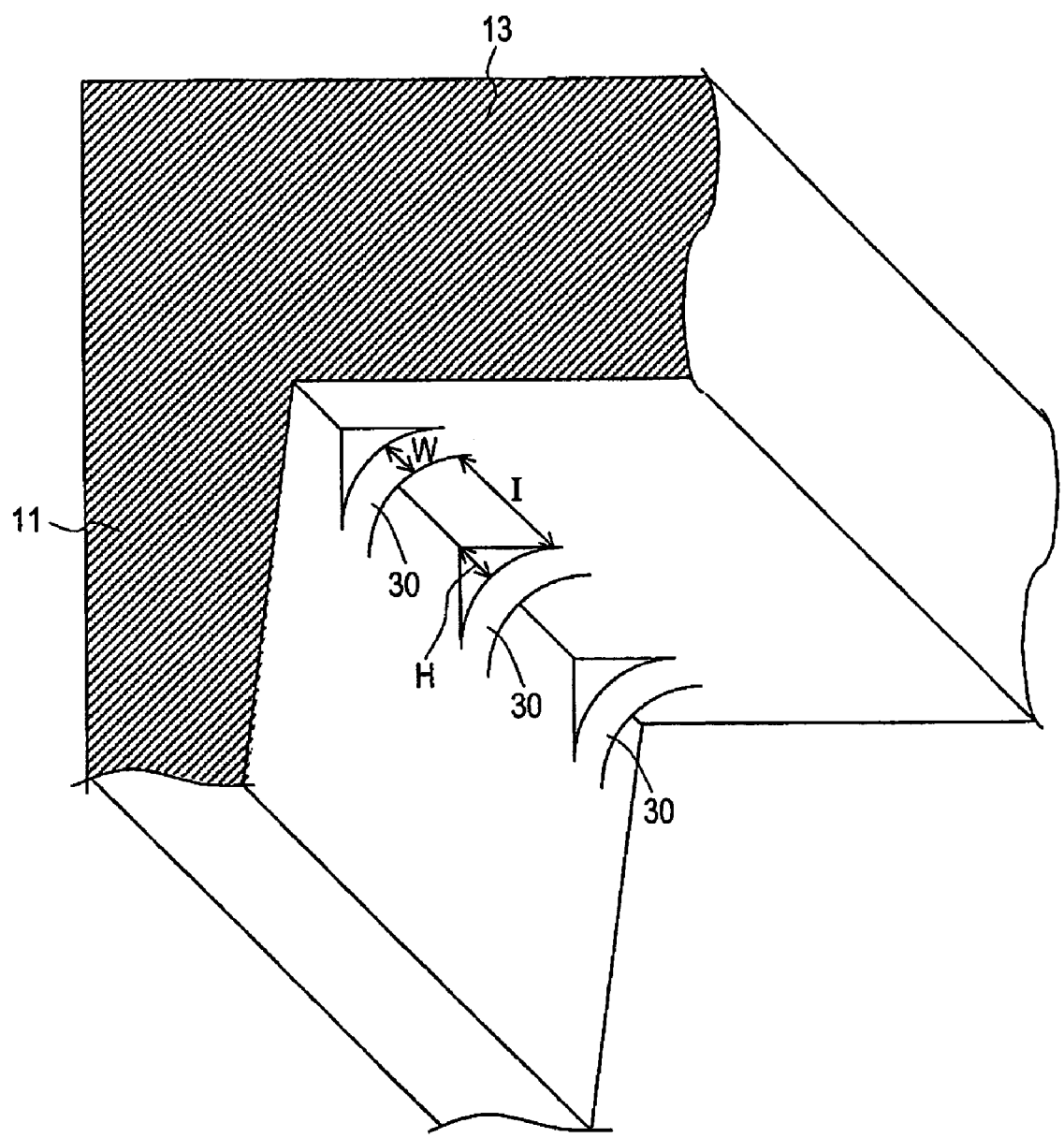
FIG. 5 is an enlarged perspective view showing the vicinity of a boundary between an inner side wall section and an upper wall section of a seat frame (region A encircled by a broken line in FIG. 4).
Figure 6:
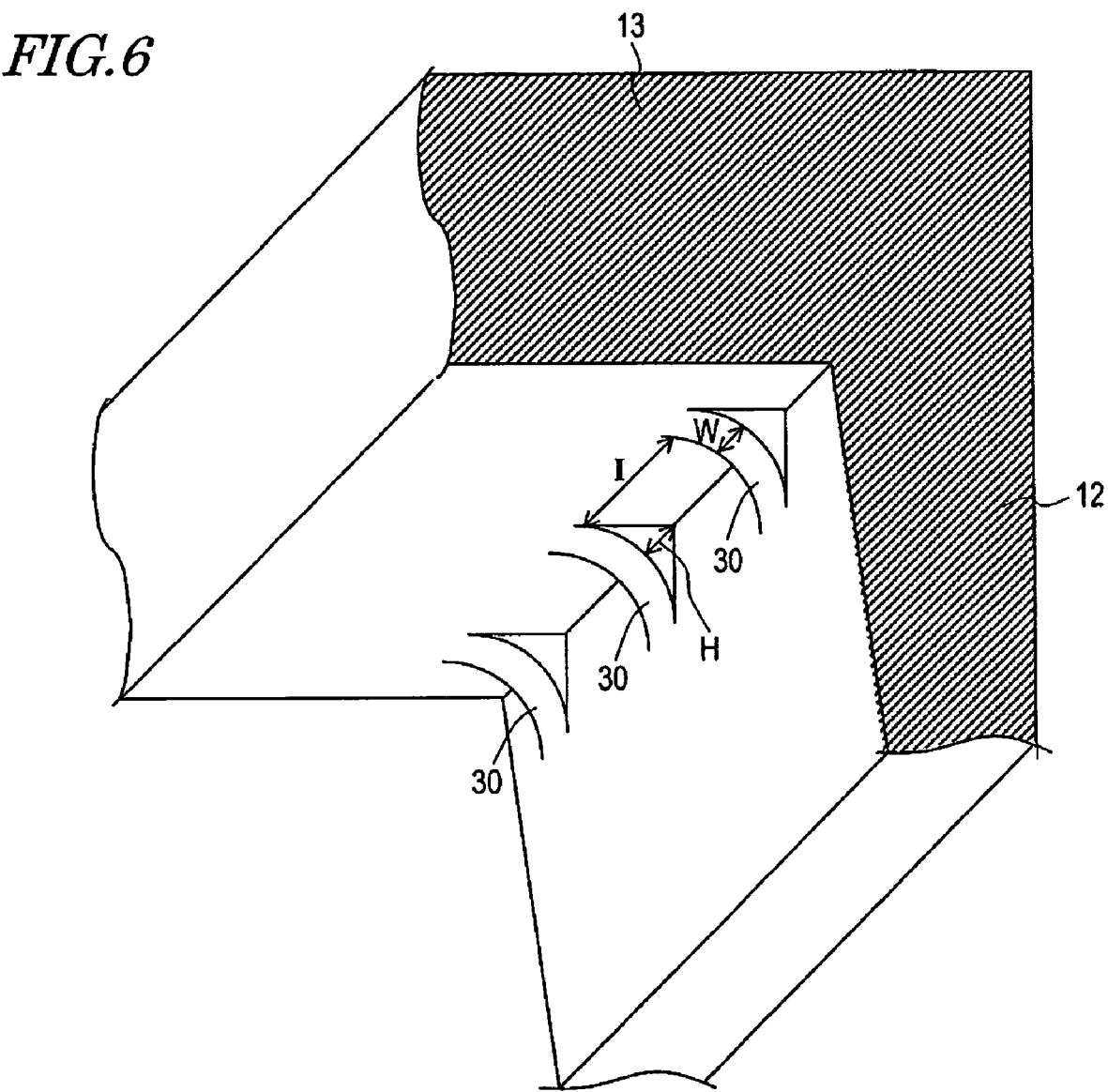
FIG. 6 is an enlarged perspective view showing the vicinity of a boundary between an outer side wall section and an upper wall section of a seat frame (region B encircled by a broken line in FIG. 4).
Figure 7A:
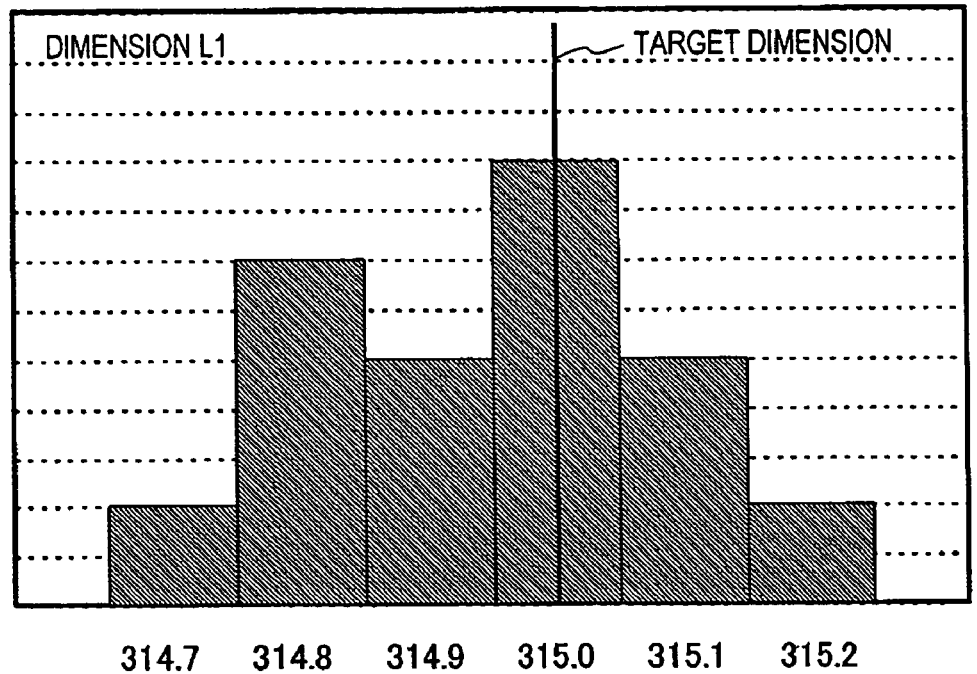
FIGS. 7A and 7B are histograms showing the results shown in Table 1.
Figure 7B:
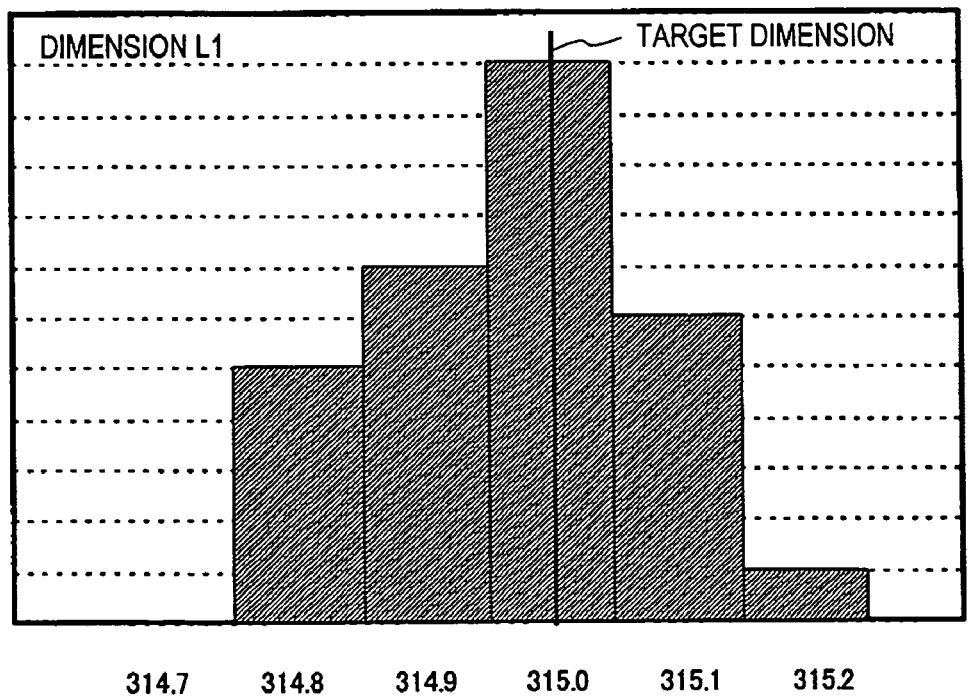
Figure 8A:
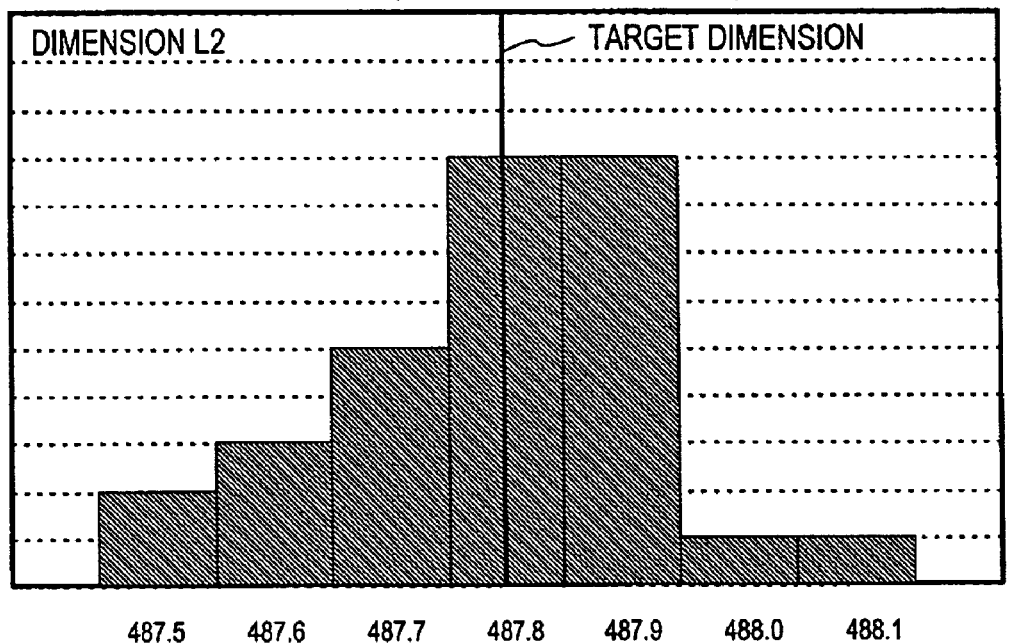
FIGS. 8A and 8B are histograms showing the results shown in Table 2.
Figure 8B:
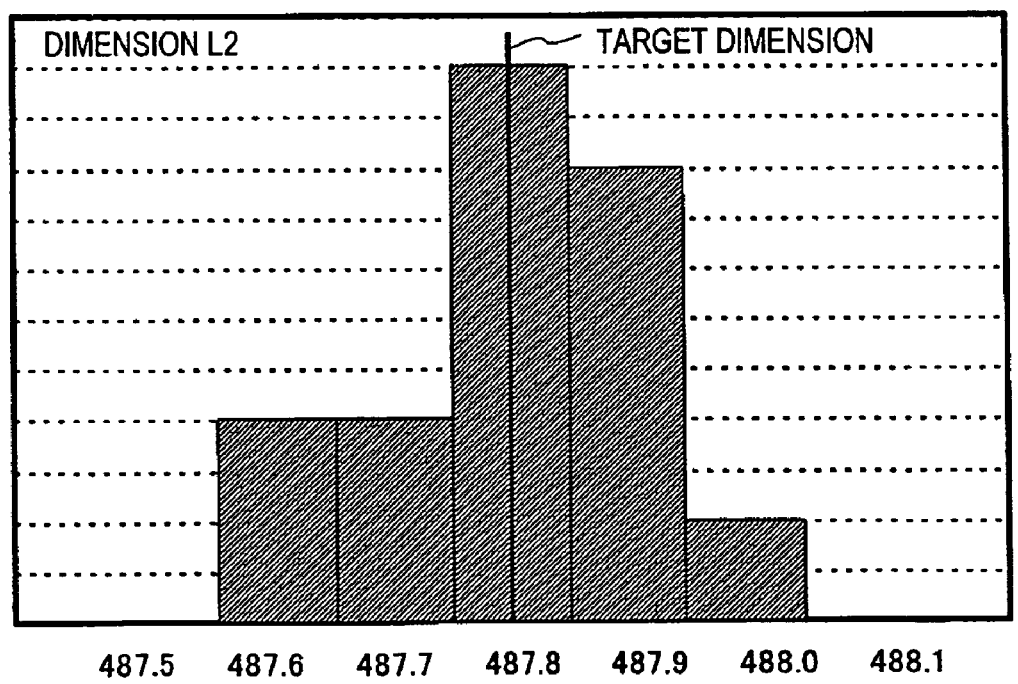

FIG. 5 and FIG. 6 are enlarged views showing the vicinity of the inner boundary (region A encircled by a broken line in FIG. 4) and the vicinity of the outer boundary (region B encircled by a broken line in FIG. 4), respectively. As shown in FIG. 5 and FIG. 6, a plurality of protrusions 30 are provided at the inner boundary and the outer boundary. The protrusions 30 provided at the inner boundary are integrally formed with the inner side wall section 11 and the seat mounting section 13 to bridge the inner side wall section 11 and the seat mounting section 13. The protrusions 30 provided at the outer boundary are integrally formed with the outer side wall section 12 and the seat mounting section 13 to bridge the outer side wall section 12 and the seat mounting section 13. The plurality of protrusions 30 are spaced apart at a predetermined distance, interspace I, along the vehicle length direction.

Generally speaking, when a part is molded by a casting technique such as a die-casting technique, the filled melt begins to be cooled at the outside where it is in contact with the mold, and after the outside of the part has solidified, its interior begins to solidify. Therefore, due to a shrinkage associated with the solidification of the melt, shrinkage cavities may occur in the interior of the part. Moreover, if the part has portions of different thicknesses, the melt cooling rate will differ between such portions of different thicknesses, which makes shrinkage cracks liable to occur at boundaries between portions of different thicknesses. Moreover, since a magnesium alloy has a small specific heat (specific heat at constant volume), its melt is susceptible to cooling at thin portions. Therefore, when molding a magnesium alloy part by a casting technique such as a die-casting technique, a large difference in the cooling rate of the melt tends to occur between portions of different thicknesses, thus making shrinkage cracks even more liable to occur at boundaries between portions of different thicknesses.

In the seat frame 100 of the present preferred embodiment, a plurality of protrusions 30 are provided at the boundary between the inner side wall section 11 and the seat mounting section 13 (which have different thicknesses) and at the boundary between the outer side wall section 12 and the seat mounting section 13 (which also have different thicknesses), whereby the surface area of each such boundary is increased. This provides for an increased cooling rate at the boundaries during molding, thus suppressing the occurrence of shrinkage cavities and shrinkage cracks due to differing cooling rates. Thus, deterioration in the strength of the seat frame 100 can be prevented. Moreover, the plurality of protrusions 30 which are provided along the vehicle length direction (front-rear direction) at the predetermined interspace I allow dispersion of the shrinkage of the seat rails 10A and 10B along the vehicle length direction (i.e., shrinkage associated with the solidification of the melt), thus also improving the dimensional accuracy. Hereinafter, results of examining the effects of an improvement in the dimensional accuracy due to the protrusions 30 will be described.

A number of seat frames 100 according to the present preferred embodiment (having protrusions 30) and a number of conventional seat frames (lacking protrusions) were produced. The same number of each were used as samples. The dimensions of each sample were measured, and a mean value and a standard deviation were calculated for each category. The results are shown in Table 1 and Table 2. Table 1 shows results concerning a dimension (length) L1 (see FIG. 3) from the first engaging portion 11a for coupling to the main frame 102 and the fourth engaging portion 13d for coupling to the side cover 138. Table 2 shows results concerning a dimension (length) L2 (see FIG. 3) from the first engaging portion 11a to the third engaging portion 13c for coupling to the rider's seat 136. The design values (target dimensions) for the dimension L1 and the dimension L2 were 315.0 mm and 487.8 mm, respectively, for example.

TABLE 1

| Comparative Examples (w/o protrusions) | dimension (mm) | Examples (with protrusions) | dimension (mm) |
|---|---|---|---|
| 1 | 314.7 | 1 | 314.8 |
| 2 | 314.7 | 2 | 314.8 |
| 3 | 314.8 | 3 | 314.8 |
| 4 | 314.8 | 4 | 314.8 |
| 5 | 314.8 | 5 | 314.8 |
| 6 | 314.8 | 6 | 314.9 |
| 7 | 314.8 | 7 | 314.9 |
| 8 | 314.8 | 8 | 314.9 |
| 9 | 314.8 | 9 | 314.9 |
| 10 | 314.9 | 10 | 314.9 |
| 11 | 314.9 | 11 | 314.9 |
| 12 | 314.9 | 12 | 314.9 |
| 13 | 314.9 | 13 | 315.0 |
| 14 | 314.9 | 14 | 315.0 |
| 15 | 315.0 | 15 | 315.0 |
| 16 | 315.0 | 16 | 315.0 |
| 17 | 315.0 | 17 | 315.0 |
| 18 | 315.0 | 18 | 315.0 |
| 19 | 315.0 | 19 | 315.0 |
| 20 | 315.0 | 20 | 315.0 |
| 21 | 315.0 | 21 | 315.0 |
| 22 | 315.0 | 22 | 315.0 |
| 23 | 315.0 | 23 | 315.0 |
| 24 | 315.1 | 24 | 315.1 |
| 25 | 315.1 | 25 | 315.1 |
| 26 | 315.1 | 26 | 315.1 |
| 27 | 315.1 | 27 | 315.1 |
| 28 | 315.1 | 28 | 315.1 |
| 29 | 315.2 | 29 | 315.1 |
| 30 | 315.2 | 30 | 315.2 |
| mean value | 314.95 | mean value | 314.97 |
| standard deviation | 0.14 | standard deviation | 0.11 |

TABLE 2

| Comparative Examples (w/o protrusions) | dimension (mm) | Examples (with protrusions) | dimension (mm) |
|---|---|---|---|
| 31 | 487.5 | 31 | 487.6 |
| 32 | 487.5 | 32 | 487.6 |
| 33 | 487.6 | 33 | 487.6 |
| 34 | 487.6 | 34 | 487.6 |
| 35 | 487.6 | 35 | 487.7 |
| 36 | 487.7 | 36 | 487.7 |
| 37 | 487.7 | 37 | 487.7 |
| 38 | 487.7 | 38 | 487.7 |
| 39 | 487.7 | 39 | 487.8 |
| 40 | 487.7 | 40 | 487.8 |
| 41 | 487.8 | 41 | 487.8 |
| 42 | 487.8 | 42 | 487.8 |
| 43 | 487.8 | 43 | 487.8 |
| 44 | 487.8 | 44 | 487.8 |
| 45 | 487.8 | 45 | 487.8 |
| 46 | 487.8 | 46 | 487.8 |
| 47 | 487.8 | 47 | 487.8 |
| 48 | 487.8 | 48 | 487.8 |
| 49 | 487.8 | 49 | 487.8 |
| 50 | 487.9 | 50 | 487.9 |
| 51 | 487.9 | 51 | 487.9 |
| 52 | 487.9 | 52 | 487.9 |
| 53 | 487.9 | 53 | 487.9 |
| 54 | 487.9 | 54 | 487.9 |
| 55 | 487.9 | 55 | 487.9 |
| 56 | 487.9 | 56 | 487.9 |
| 57 | 487.9 | 57 | 487.9 |
| 58 | 487.9 | 58 | 487.9 |
| 59 | 488.0 | 59 | 488.0 |
| 60 | 488.1 | 60 | 488.0 |
| mean value | 487.79 | mean value | 487.80 |
| standard deviation | 0.14 | standard deviation | 0.11 |

It can be seen from Table 1 and Table 2 that, in the seat frames 100 having protrusions 30 (Examples), the mean value of each dimension is closer to its target dimension and the standard deviation is smaller than in the seat frames lacking protrusions (Comparative Examples). The results shown in Table 1 and Table 2 are also presented in the form of histograms in FIGS. 7A and 7B and FIGS. 8A and 8B. It can be seen from the graphs of FIGS. 7A and 7B and FIGS. 8A and 8B that, among the seat frames 100 having protrusions 30 (Examples), there are fewer samples whose dimensions deviate greatly from the target dimensions than among the seat frames lacking protrusions (Comparative Examples). Thus, providing the protrusions 30 improves the dimensional accuracy.

Note that, in the above-described Comparative Examples and Examples, a gate portion (described in detail later) through which the melt is injected is positioned between the first engaging portion 11a and the third engaging portion 13c along the vehicle length direction, and more specifically between the first engaging portion 11a and the fourth engaging portion 13d. In such a case, the mold temperature is likely to fluctuate near the gate portion, thus resulting in varying cooling rates. Therefore, a significant dimensional mismatch would occur if the protrusions were not provided. Therefore, in a construction where a gate portion exists between engaging portions, a dimensional mismatch can be effectively prevented by providing the protrusions 30 at least in the regions corresponding to the gate portions.

In order to sufficiently increase the surface area at the boundaries and allow the shrinkage of the seat rails 10A and 10B along the vehicle length direction to sufficiently disperse, it is preferable that the width W of each protrusion 30 along the vehicle length direction is no less than about 0.3 mm and no more than about 1.5 mm and that the plurality of protrusions 30 are disposed at an interspace I of no less than about 2.0 mm and no more than about 10.0 mm, for example. Moreover, it is preferable that the height H of the protrusions 30 is no less than about 1 mm and no more than about 3 mm, for example. Furthermore, from a similar standpoint, it is preferable that any cross-section of each protrusion 30 that is perpendicular or substantially perpendicular to the vehicle length direction and parallel to the vehicle width direction (i.e., any cross-section parallel to the planes of FIG. 5 and FIG. 6) has an area of no less than about 0.5 mm$^2$ and no more than about 6.0 mm$^2$, for example. Note that the protrusions 30 may have any shape that allows for an increased surface area at the boundaries, and the shape of the protrusions 30 is not limited to the shape illustrated in FIG. 5 and FIG. 6.

Although the present preferred embodiment illustrates an example where both seat rails 10A and 10B have the protrusions 30, the effect of preventing a deterioration in strength can also be obtained in a construction where only one of the seat rails 10A and 10B has the protrusions 30. In the case where both seat rails 10A and 10B have the protrusions 30, as in the present preferred embodiment, variations in strength and rigidity between one seat rail 10A and the other seat rail 10B can be reduced.

Moreover, it is not necessary that each of the seat rails 10A and 10B has protrusions 30 at both the inner boundary and the outer boundary. Note that the protrusions 30 may be provided at least one of the inner boundary and the outer boundary. However, it will be appreciated that a higher effect of preventing deterioration in strength can be obtained in the case where the protrusions 30 are provided at both the inner boundary and the outer boundary than in the case where the protrusions 30 are provided at only one of them.

Figure 9:
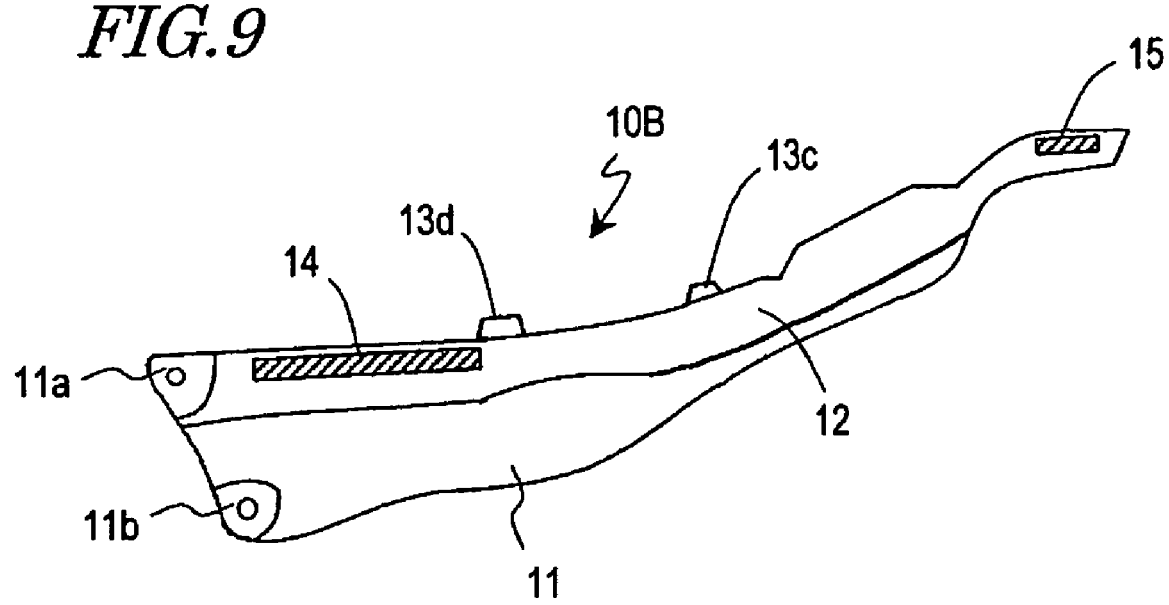
FIG. 9 is a side view schematically showing a seat frame according to a preferred embodiment of the present invention.

In the present preferred embodiment, as shown in FIG. 4 and FIG. 9, each of the pair of seat rails 10A and 10B has a gate portion 14 through which the melt is injected. In other words, when molding the seat frame 100, injection of the melt occurs at both the right and left seat rails 10A and 10B. More specifically, the gate portion 14 is provided at a side surface that is on the outer side (along the vehicle width direction) of the seat mounting section 13 of each of the seat rails 10A and 10B, and located between the first engaging portion 11a and the fourth engaging portion 13d along the vehicle length direction. Moreover, each of the pair of seat rails 10A and 10B includes an overflow portion 15 through which the excess melt flows out (FIG. 9 only shows the overflow portion 15 of the seat rail 10B).

Note that the seat frame 100 having been removed from the mold after casting is to be separated from a runner at the gate portion 14. If the thickness of the gate portion 14 is smaller than the thickness of the seat mounting section 13, the runner can be easily broken off.

Figure 10:
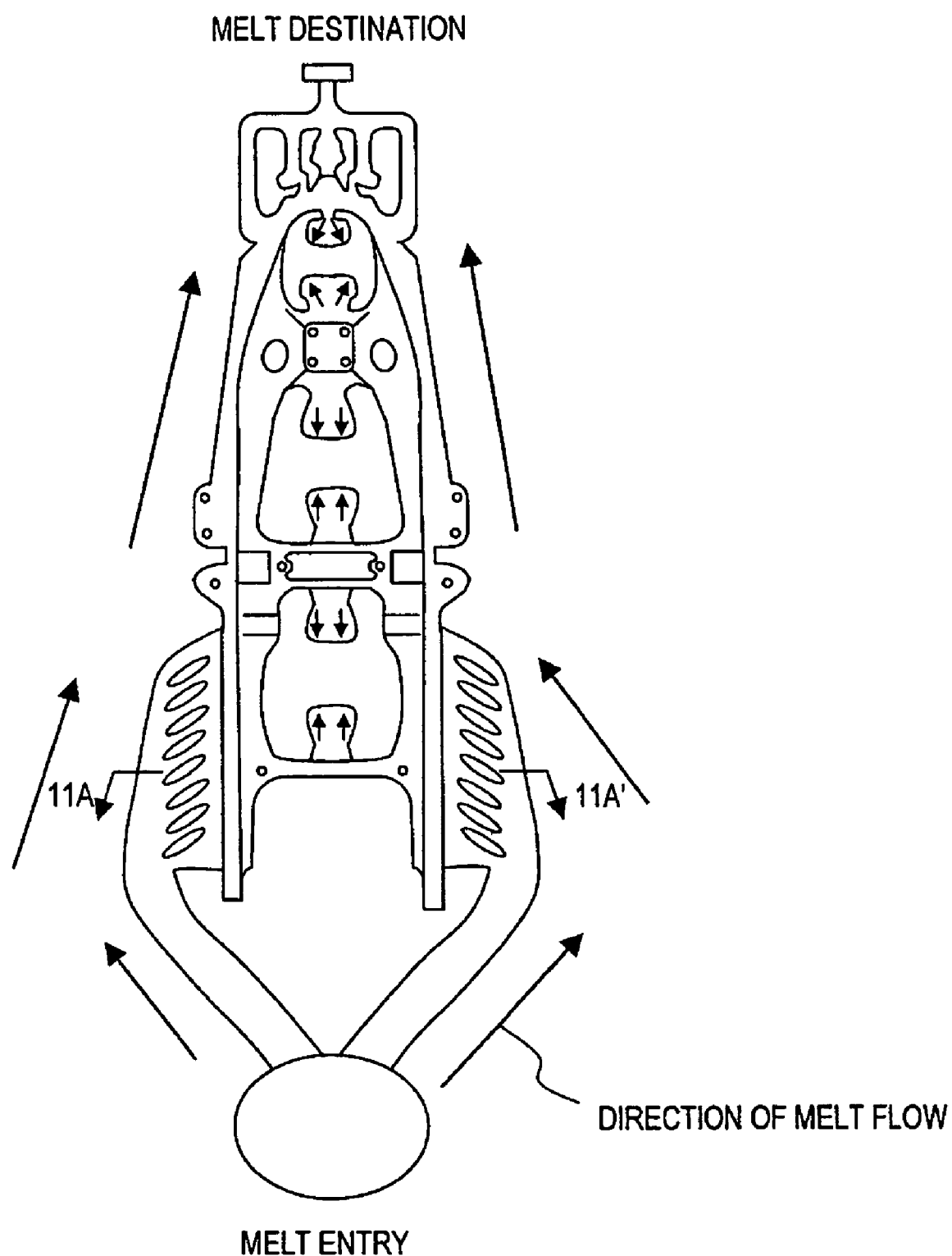
FIG. 10 is a diagram schematically showing a flow of the melt when molding a seat frame.
Figure 11:
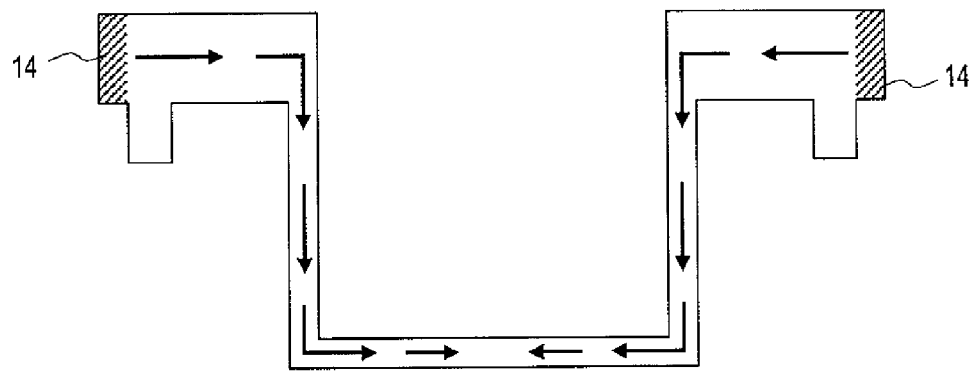
FIG. 11 is a diagram schematically showing a flow of the melt when molding a seat frame, which is a cross-sectional view taken along line 11A-11A' in FIG. 10.

FIG. 10 and FIG. 11 schematically show a flow of the melt during molding. As shown in FIG. 10 and FIG. 11, the melt is injected via the gate portion 14, which is located at the front side of each of the seat rails 10A and 10B (i.e., so as to be closer to the internal combustion engine 108), and excess melt flows out via the overflow portion 15, which is located at the rear side of each of the seat rails 10A and 10B. In other words, the melt flows along the front to rear direction of the seat frame 100 (i.e., the vehicle length direction). Note that, as shown in FIG. 10, some of the melt also flows out at the central portion (along the vehicle width direction) of the cross member 20.

It will be appreciated that the positioning of the gate portion 14 is not limited to the above. For example, WO 2004/035373 discloses a casting method which involves providing a gate portion on one of a pair of seat rails and providing an overflow portion in the other, such that the melt is allowed to flow along the right to left direction of the seat frame (i.e., the vehicle width direction); such positioning may also be used.

Generally speaking, when molding a magnesium alloy part by a casting technique, it is important to make the flow route of the melt as short as possible in order to enhance the fillability of the melt. Therefore, as for a seat frame, it is primarily conceivable to allow the melt to flow along the vehicle width direction, as is disclosed in WO 2004/035373. When such a positioning is used, the occurrence of shrinkage cracks can be sufficiently suppressed by providing the protrusions 30 on the seat rail on which the gate portion 14 is provided. However, providing the protrusions 30 in only one of the seat rails 10A and 10B will result in differing shapes of the seat rails 10A and 10B and hence varying strength and rigidity between the right and left of the seat frame 100, which may possibly deteriorate the running performance. In the case where the gate portion 14 is provided on only one of the seat rails 10A and 10B, too, the protrusions 30 may be provided on both seat rails 10A and 10B, in order to reduce variations in strength and rigidity of the seat frame 100 between the right and left.

Even when the right-left shape symmetry is ensured by providing the protrusions 30 on both seat rails 10A and 10B, if the gate portion 14 is provided on only one of the seat rails 10A and 10B, the melt flow and/or cooling rate during casting will differ between one seat rail 10A and the other seat rail 10B and there will be a slight difference in strength and rigidity between the right and left seat rails 10A and 10B. As in the present preferred embodiment, by providing a gate portion 14 on each of the pair of seat rails 10A and 10B and allowing the melt to flow along the vehicle length direction, the difference in thermal hysteresis between the right and left seat rails 10A and 10B can be reduced, and the variations in strength and rigidity between one seat rail 10A and the other seat rail 10B can be minimized. Moreover, the time from start to end of the filling of the melt can be shortened, which also prevents and minimizes the occurrence of shrinkage cracks and shrinkage cavities.

It is preferable that the gate portion 14 is provided at a side surface that is on the outer side (along the vehicle width direction) of the seat mounting section 13 of each of the seat rails 10A and 10B, as in the present preferred embodiment. By providing the gate portion 14 on the outer side surface of the seat mounting section 13, the finishing process is facilitated and the filling distance is reduced, whereby both castability (moldability) and finishability can be enhanced.

Moreover, in the case where the gate portion 14 is provided on the outer side wall section 12, it is preferable that the protrusions 30 are provided at least an outer boundary (boundary between the outer side wall section 12 and the seat mounting section 13) of each of the seat rails 10A and 10B. When the protrusions 30 are provided at the outer boundary, which is in the vicinity of the gate portion 14, it becomes possible to increase the cooling rate in the vicinity of the gate portion 14, where the mold temperature is liable to increase and stay high. As a result, the occurrence of shrinkage cracks at the outer boundary in the vicinity of the gate portion 14 can be suppressed.

Next, a method for producing the seat frame 100 will be described. The seat frame 100 can be suitably produced by a die-casting technique, for example. Die-casting, which is a casting method using a mold, provides a high dimensional accuracy, and thus is suitable for mass production.

As the specific magnesium alloy which is the material of the seat frame 100, it is preferable to use an Mg—Al—Mn alloy. In particular, it is preferable to use an Mg—Al—Mn alloy containing no less than about 3 wt % and no more than about 9 wt % of Al and no less than about 0.1 wt % and no more than about 6.5 wt % of Mn, for example, in order to ensure ductility. For example, an AM60B alloy under the ASTM standard (an Mg—Al—Mn alloy containing approximately 5.5 wt % to 6.5 wt % of Al, 0.24 wt % to 0.6 wt % of Zn, 0.25 wt % to 0.5 wt % of Mn, no more than 0.1 wt % of Si, no more than 0.01 wt % of Cu, no more than 0.02 wt % of Ni, no more than 0.05 wt % of Fe, and no more than 0.02 wt % of other impurities) can be suitably used, for example.

The seat frame 100 can also be suitably produced by a Thixomolding (semi-melted molding) technique. According to the Thixomolding technique, a metal material in a semi-melted state is injected into a mold. In the present specification, a metal material in a semi-melted state is also referred to as a "melt" unless otherwise specified. Preferred embodiments of the present invention may be suitably used for a seat frame 100 which is molded by a technique which injects the melt into a mold at a high speed and high pressure, e.g., a die-casting technique or Thixomolding technique.

Figure 12:
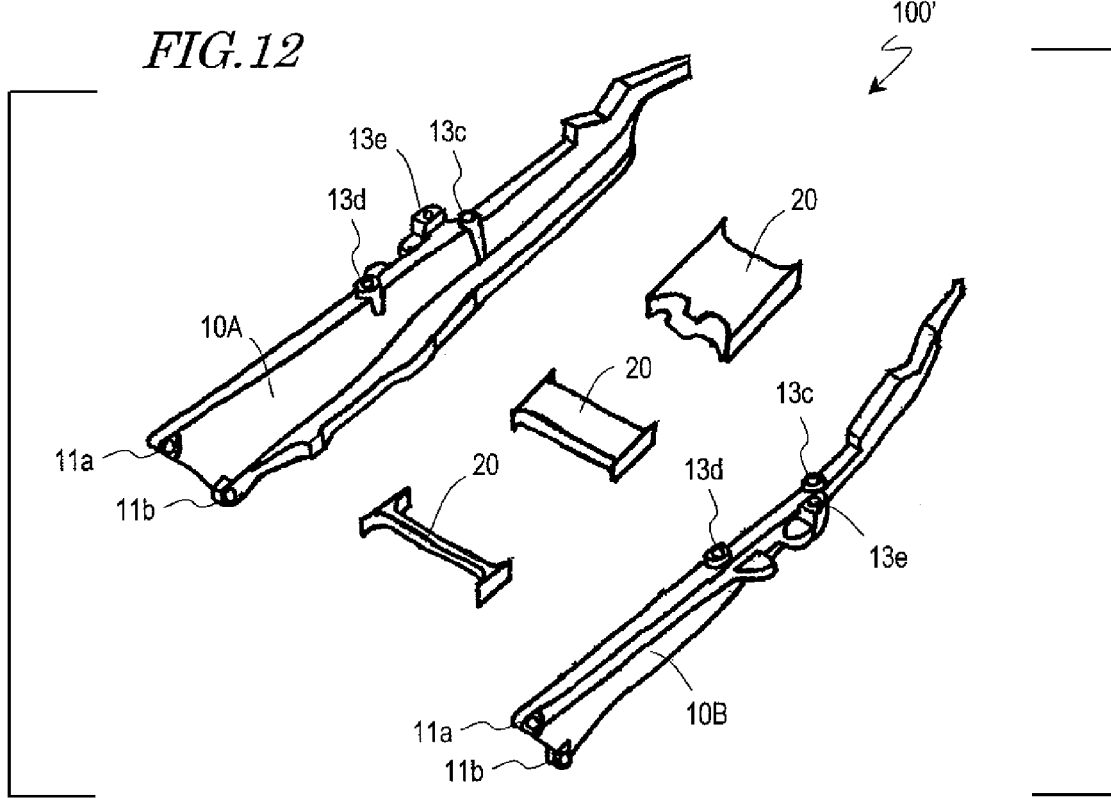
FIG. 12 is an exploded perspective view schematically showing a seat frame according to a preferred embodiment of the present invention.

Although the present preferred embodiment illustrates an example of the present invention where seat rails 10A and 10B and the cross member 20 preferably are integrally formed, the preferred embodiments of the present invention are not limited thereto. FIG. 12 is an exploded perspective view showing a seat frame 100' in which the cross member 20 and the seat rails 10A and 10B are formed as separate pieces. In the seat frame 100' shown in FIG. 12, the cross member 20 and the seat rails 10A and 10B are coupled to each other by fastening members such as bolts.

As described above, according to the preferred embodiments of the present invention, the occurrence of shrinkage cracks and shrinkage cavities when molding a magnesium alloy frame part (seat rail) can be minimized and prevented. As a result, it is possible to achieve a frame part and a seat frame for a motorcycle having a light weight and a high strength. Thus, a motorcycle incorporating a seat frame according to the various preferred embodiments of the present invention, which has a high strength and a light weight, is excellent in terms of running performance and vehicle stability.

According to the preferred embodiments of the present invention, occurrence of shrinkage cracks and shrinkage cavities when molding a magnesium alloy frame part is prevented and minimized, whereby a magnesium alloy frame part having a high strength can be provided. A frame part according to the various preferred embodiments of the present invention has a light weight and a high strength, and therefore is suitably used as a structural part of a motorcycle.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2007-185348 filed on Jul. 17, 2007, the entire contents of which are hereby incorporated by reference. Furthermore, the entire contents of Japanese Patent Application No. 2008-180561 filed on Jul. 10, 2008, are hereby incorporated by reference.

What is claimed is:

1. A seat frame for a motorcycle comprising:
   a pair of frame parts; and
   a linking member arranged to link the pair of frame parts to each other; wherein
   the pair of frame parts and the linking member are integrally formed;
   each of the pair of frame parts is a magnesium alloy frame part; and
   the magnesium alloy frame part includes:
      a seat mounting section arranged to mount a seat mounted thereon, the seat mounting section extending along a vehicle length direction;
      a first side wall section extending from the seat mounting section;
      a second side wall section extending from the seat mounting section and being located on an outer side, along a vehicle width direction, of the first side wall section; and
      a plurality of protrusions provided at least one of a boundary between the seat mounting section and the first side wall section and a boundary between the seat mounting section and the second side wall section; wherein
      the seat mounting section has a thickness greater than at least one of a thickness of the first side wall section and a thickness of the second side wall section;
      each of the pair of frame parts includes a gate portion; and
      the gate portion is provided at an outer side surface, along the vehicle width direction, of the seat mounting section of each of the pair of frame parts.

2. The seat frame for a motorcycle of claim 1, wherein the plurality of protrusions are provided at both of the boundary between the seat mounting section and the first side wall section and the boundary between the seat mounting section and the second side wall section.

3. The seat frame for a motorcycle of claim 1, wherein each of the pair of frame parts includes the plurality of protrusions at least in the boundary between the seat mounting section and the second side wall section.

4. A motorcycle comprising:
   the seat frame for a motorcycle of claim 1; and
   a seat supported by the seat frame.

5. A seat frame for a motorcycle comprising:
   a pair of frame parts; and
   a linking member arranged to link the pair of frame parts to each other; wherein
   the pair of frame parts and the linking member are integrally formed;
   each of the pair of frame parts is a magnesium alloy frame part; and
   the magnesium alloy frame part includes:
      a seat mounting section arranged to mount a seat mounted thereon, the seat mounting section extending along a vehicle length direction;
      a first side wall section extending from the seat mounting section;
      a second side wall section extending from the seat mounting section and being located on an outer side, along a vehicle width direction, of the first side wall section; and
      a plurality of protrusions provided at at least one of a boundary between the seat mounting section and the first side wall section and a boundary between the seat mounting section and the second side wall section; wherein
      the seat mounting section has a thickness greater than at least one of a thickness of the first side wall section and a thickness of the second side wall section;
      each of the pair of frame parts includes a gate portion; and
      the gate portion has a thickness smaller than a thickness of the seat mounting section.

6. A seat frame for a motorcycle comprising:
a pair of frame parts; and
a linking member arranged to link the pair of frame parts to each other; wherein
the pair of frame parts and the linking member are integrally formed; and
each of the pair of frame parts is a magnesium alloy frame part; and
the magnesium alloy frame part includes:
- a seat mounting section arranged to mount a seat mounted thereon, the seat mounting section extending along a vehicle length direction;
- a first side wall section extending from the seat mounting section;
- a second side wall section extending from the seat mounting section and being located on an outer side, along a vehicle width direction, of the first side wall section; and
- a plurality of protrusions provided at at least one of a boundary between the seat mounting section and the first side wall section and a boundary between the seat mounting section and the second side wall section; wherein
- the seat mounting section has a thickness greater than at least one of a thickness of the first side wall section and a thickness of the second side wall section;
- each of the pair of frame parts includes a gate portion; and
- at least some of the plurality of protrusions are provided in a region corresponding to the gate portion.

7. A magnesium alloy frame part for use in a seat frame of a motorcycle, comprising:
a seat mounting section arranged to mount a seat mounted thereon, the seat mounting section extending along a vehicle length direction;
a first side wall section extending from the seat mounting section;
a second side wall section extending from the seat mounting section and being located on an outer side, along a vehicle width direction, of the first side wall section; and
a plurality of protrusions provided at at least one of a boundary between the seat mounting section and the first side wall section and a boundary between the seat mounting section and the second side wall section; wherein
the seat mounting section has a thickness greater than at least one of a thickness of the first side wall section and a thickness of the second side wall section; and
a width of each of the plurality of protrusions along the vehicle length direction is no less than about 0.3 mm and no more than about 1.5 mm, and the plurality of protrusions are spaced apart at a distance of no less than about 2.0 mm and no more than about 10.0 mm.

8. The magnesium alloy frame part of claim 7, wherein an area of any cross-section of each of the plurality of protrusions that is substantially perpendicular to the vehicle length direction and parallel to the vehicle width direction is no less than about 0.5 mm$^2$ and no more than about 6.0 mm$^2$.

9. A seat frame for a motorcycle comprising:
a pair of frame parts; and
a linking member arranged to link the pair of frame parts to each other; wherein
the pair of frame parts and the linking member are integrally formed; and
each of the pair of frame parts is a magnesium alloy frame part; and
the magnesium alloy frame part includes:
- a seat mounting section arranged to mount a seat mounted thereon, the seat mounting section extending along a vehicle length direction;
- a first side wall section extending from the seat mounting section;
- a second side wall section extending from the seat mounting section and being located on an outer side, along a vehicle width direction, of the first side wall section; and
- a plurality of protrusions provided at at least one of a boundary between the seat mounting section and the first side wall section and a boundary between the seat mounting section and the second side wall section; wherein
- the seat mounting section has a thickness greater than at least one of a thickness of the first side wall section and a thickness of the second side wall section;
- each of the pair of frame parts includes a gate portion; and
- each of the pair of frame parts includes a plurality of engaging portions arranged to couple the seat frame to another part, and the gate portion is located between the plurality of engaging portions along the vehicle length direction.

* * * * *